O. W. POTTS.
LENS AND METHOD OF MAKING THE SAME.
APPLICATION FILED MAR. 22, 1919.
1,332,410.
Patented Mar. 2, 1920.
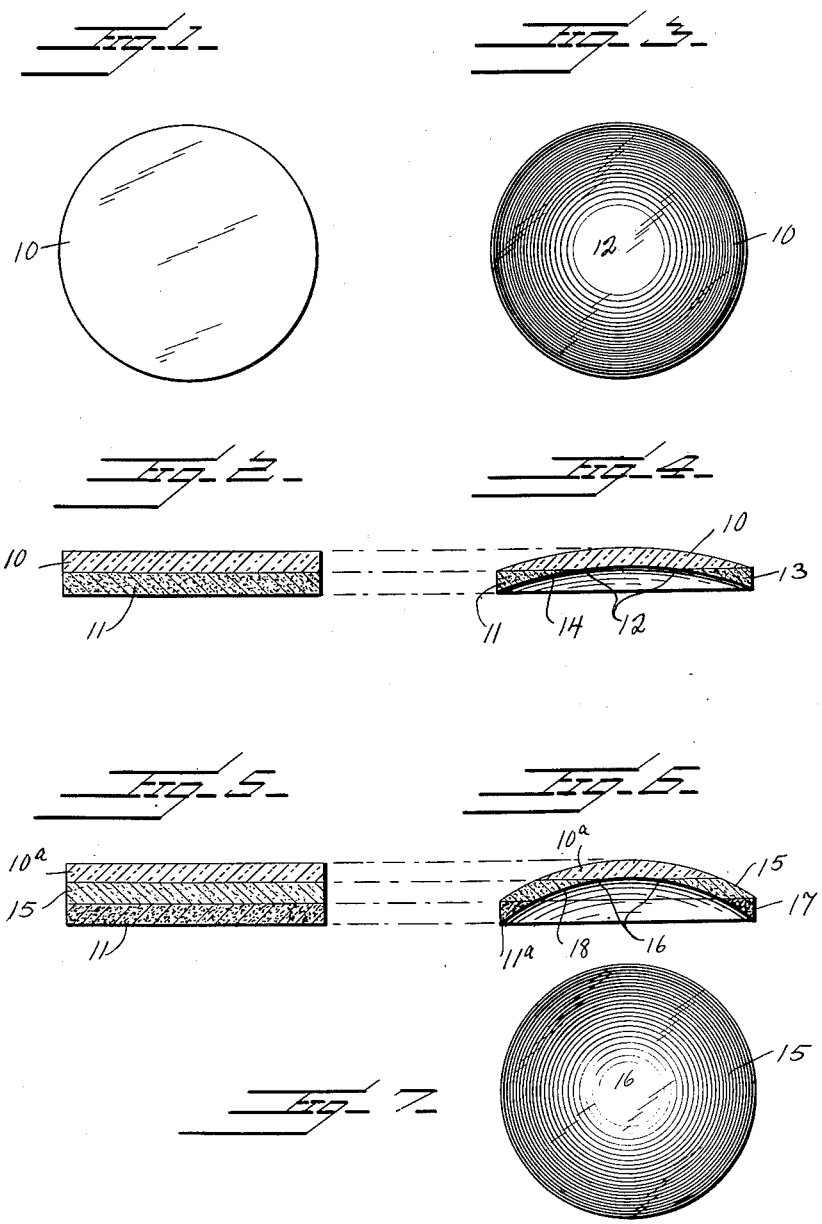
Inventor
O.W. Potts
By Watson E. Coleman
Attorney

UNITED STATES PATENT OFFICE.

OSCERO W. POTTS, OF CAMDEN, NEW JERSEY.

LENS AND METHOD OF MAKING THE SAME.

1,332,410. Specification of Letters Patent. Patented Mar. 2, 1920.

Application filed March 22, 1919. Serial No. 284,256.

*To all whom it may concern:*

Be it known that I, OSCERO W. POTTS, a citizen of the United States, residing at Camden, in the county of Camden and State of New Jersey, have invented certain new and useful Improvements in Lenses and Methods of Making the Same, of which the following is a specification, reference being had to the accompanying drawings.

This invention relates to optical lenses, and particularly to lenses without reference to their contour, wherein the central portion of the lens is clear or of relatively clear glass, while the perimeter of the lens, or that portion exterior to the central, clear portion, is of glass having a less permeability to light rays.

The general object of this invention is to provide a lens having a central, clear portion, and a perimeter of relatively dark or opaque glass, and an intermediate zone between the central zone and the exterior, annular zone, which is toned or shaded as it may be termed, from clear to dark or opaque.

A further object is to provide a method whereby lenses of this character may be very cheaply constructed, and whereby a lens of this character may be formed, may have any desired curvature, form, or contour, and in which the central portion of the lens shall have one optical quality, the perimeter of the lens shall have another optical quality, and the intermediate zone between the central portion and the perimeter may have an optical quality graduating from the quality of the central zone to that of the outer or peripheral zone.

My invention is illustrated in the accompanying drawings, wherein:—

Figure 1 is a face view of a lens constructed in accordance with my invention and before grinding;

Fig. 2 is a diametrical section of a lens before grinding;

Fig. 3 is a face view of the lens after grinding;

Fig. 4 is a diametrical section of the lens after grinding;

Fig. 5 is a diametrical section of another form of lens before grinding;

Fig. 6 is a like view of the lens shown in Fig. 5 after grinding; and

Fig. 7 is a face view of the lens shown in Fig. 6.

I will first described the method by which the lens is made, and referring to Figs. 1 to 4, it will be seen that herein I have illustrated a lens which is initially formed of two flat or "plano" sheets or disks of glass, designated respectively 10 and 11, which are cemented, fused, or otherwise permanently connected to each other over their entire contacting surfaces, the disk 10 being made of clear, transparent glass, and the disk 11 of a colored or relatively deep toned glass.

These disks 10 and 11 are cemented, fused, or otherwise attached to each other, and then these disks are ground in the manner illustrated in Fig. 4, that portion of the compound disk formed by the relatively opaque glass 11 being concavely ground, while that portion of the compound disk formed by the clear glass is convexly ground. By this grinding, it will be seen that the dark glass or relatively opaque glass 11 is entirely cut away at the center of the lens, as at 12, so that at this central portion there remains only the slightly ground clear glass 10, while the annular ring of opaque glass so left by this grinding of the concave face is very thin at the point of junction of the opaque glass with the clear glass at the edge of the portion 12 and the opaque glass becomes thicker as it nears the periphery of the lens. Preferably, though not necessarily, the relatively clear glass 10 is convexly ground, as illustrated in Fig. 4, so that it has a maximum thickness at its center and gradually thins outward toward its periphery so that when the grinding is completed, a concavo-convex lens is produced having a central, relatively clear or relatively transparent zone, a relatively opaque, dense, or darkly colored zone at its perimeter, as at 13, and an intermediate zone 14 in which the color shades gradually from dark inward toward the light or transparent central portion.

I do not wish to be limited to grinding the outer face of the disk 10 convexly, as this disk 10 might be given any other optical configuration and, indeed, might be left plain and of uniform thickness throughout, as in this case I would also attain the object of forming the complete lens with a central, clear zone, an outer, relatively opaque or deeply colored perimeter, and an intermediate zone where the color or opacity gradually becomes less as it nears the central, clear zone.

Neither do I wish to be limited to the use of two disks formed as illustrated in Figs. 1 to 4; as three or even more disks of glass might be superposed upon each other and cemented, fused, or otherwise attached, as indicated in Figs. 5 to 7. In these figures, I have shown a transparent disk 10ª, a relatively opaque or deeply colored disk 11ª, and an intermediate disk 15 of glass, which is intermediate in tone or opacity. When these disks are fused to each other, concavely cut on that face of the complete lens formed by the disk 11ª and convexly cut on that face formed by the disk 10ª, the central zone 16 of the completed lens will be transparent or clear, the perimeter of the completed lens will be formed by a very dark zone 17, and the intermediate disk will partially overlie the relatively dark disk 11ª and the relatively clear or transparent disk 10ª, and there will be a portion 18 of this intermediate disk which will have a concave edge face, relatively thick where it joins the relatively dark annular zone 17, and relatively thin where it joins the central, transparent zone 16. In this case, the graduation of color, tone, or opacity will be much more delicate or gradual than where only two disks are used.

While I have heretofore referred to the disks of glass as having different indices of opacity or different tones of the same color causing one disk to be more transparent or having less color than another, I do not wish to be limited to this, as it is obvious that disks of glass having different colors might be cemented to each other and ground as described so that the central portion of the glass would have a certain color and index of transparency. The outer zone might have a certain other color formed by combining the color of one disk with the color of the other disk, and the intermediate zone would graduate, as before described, from the color of one disk into the color of the other disk, or the disks might be formed of glass having different optical values of any kind. A lens of this character might also be formed by heating a disk of glass and then squeezing it in a press and regulating the squeezing operation so as to produce a lens having greatly increased resistance to light from the center toward the periphery of the lens, this increased resistance increasing with the increase in diameter.

It will be seen that with my construction, I have provided a lens having a clear center of moderate diameter, and that as the lens increases in diameter, the dark or opaque glass increases in opacity due to a corresponding lessening or thinning of the clear glass and a corresponding increased thickness of the dark glass so that at the termination of the operation of grinding or otherwise forming, I have provided a concavo-convex, spherical lens wherein, of course, allowance is made for the usual variation for optical effect. Where a cylinder is required, grinding the dark glass spherical, and the clear glass as cylindrical, gives the desired result.

It is to be understood that the terms "dark glass" or "clear glass" are purely relative and that the central zone formed by the sheet 10 or 10ª might be of colored glass, and the outer zone formed by the sheet 11 or 11ª of colored glass darker in tone than the sheet 10 or 10ª. In other words, the disks 10 or 10ª are composed of glass which offers relatively less resistance to the passage of light or the passage of certain light rays than the disks 11 or 11ª.

I claim:

1. A method of making lenses which consists in permanently engaging a plurality of initially flat disks or layers of glass with each other in superposed relation, the disks having different optical values, and grinding away the central portion of one disk of the compound lens so formed to form a concave face whereby to leave a central zone of one optical value and an exterior annular zone of a different optical value.

2. A method of making lenses which consists in permanently engaging a plurality of initially flat disks of glass with each other in superposed relation, the disks having different optical values, and then concavely grinding one face of the compound disk so formed to entirely cut away the glass of one optical value at the center of the disk to expose the glass having a different optical value at the center of the lens and form an annular zone around the central zone which is graduated in optical value from the central zone to the outer zone.

3. A method of making lenses which consists in permanently engaging disks of glass with each other in superposed relation, one of the disks of glass being clear and another of the disks being colored so as to increase its resistance to the passage of light rays, and then concavely grinding that face of the compound disk which is formed by the disk of colored glass to thereby entirely cut away the center of the disk of colored glass so as to provide a central zone of clear glass, an outer annular zone of deeply colored glass, and an intermediate zone formed by beveling the colored glass which is graduated in thickness and therefore in resistance to the passage of light rays from the central zone of clear glass to the outer zone of deeply colored glass.

4. A lens composed of a plurality of initially flat disks or layers of glass permanently engaged with each other in superposed relation, one of said disks being of clear glass and another disk being of colored glass, the compound lens formed of said disks having a clear glass disk on one face and a colored glass disk on the opposite face, that face of the lens which is formed of colored glass being concavely ground away, that face of the lens which is formed of clear glass being convexly ground away to thereby bevel the outer faces of the contiguous disks or layers to thereby leave a central zone of clear glass, an outer zone having a relatively deep intensity of color, and an intermediate zone having a color graduated from the outer zone to the central zone.

5. A lens composed of three initially flat disks or layers of glass permanently engaged with each other in superposed relation, the disk forming one of said layers being of clear glass and another of said layers being of deeply colored glass and the intermediate layer having a color between that of the deeply colored glass and the clear glass, that face of the lens formed by the colored glass being concavely ground away, the concavity extending through both of said layers of colored glass to the inner face of the clear glass, the outer faces of the clear glass and of the intermediate glass being convexly ground away, whereby to leave a central, clear zone, a deeply colored, outer zone, and an intermediate zone whose color merges gradually from the dark, outer zone to the central zone.

6. A method of making lenses which consists in permanently engaging initially flat disks of glass to each other in superposed relation, one disk of glass being clear and another disk being colored so as to increase its resistance to the passage of light rays and then forming a concavity on that face of the lens which is formed by the disk of colored glass which concavity intersects the disk of clear glass so as to provide a relatively clear, central zone, a relatively more deeply colored outer, annular zone, and an intermediate zone having its color graduating in strength from the central zone to the outer, annular zone.

In testimony whereof I hereunto affix my signature in the presence of two witnesses.

OSCERO W. POTTS.

Witnesses:
   BRUCE C. HALLOWELL,
   LEON E. TODD.